United States Patent Office 3,706,615
Patented Dec. 19, 1972

3,706,615
COMPOSITE TUBE AND A METHOD OF PRODUCING THE SAME USING THE FILAMENT WINDING PROCESS
Shigeru Nishiyama, Suita, Hiroshi Kusano, Ashiya, Yoshiro Nagai, Osaka, and Satoshi Miura, Nishinomiya, Japan, assignors to Kubota Iron & Machinery Works, Ltd., Osaka, Japan
Filed Feb. 27, 1970, Ser. No. 15,114
Claims priority, application Japan, June 4, 1969, 44/44,251, 44/44,252, 44/44,253
Int. Cl. F16r 9/08; B65h 81/00
U.S. Cl. 156—169                                                11 Claims

ABSTRACT OF THE DISCLOSURE

A method of producing a filament-wound composite tube, which comprises winding glass fiber threads impregnated with a thermosetting resin on the outer surface of a mandrel, forming a sheet material comprised of paper or cloth or the like having a coating thereon of a thermosetting resin or a mixture of a thermosetting resin and additives such as sand, successively winding the resulting sheet material onto the outer surface of the wound glass fiber threads to thereby form a number of layers of sheet material, and winding an outer layer of glass fiber threads impregnated with a thermosetting resin onto the exterior surface of the intermediate sheet material is disclosed. A composite tube produced by the filament-winding process comprising inner and outer layers of glass fiber threads impregnated with a thermosetting resin, and then an intermediate layer comprised of the sheet material which is in turn comprised of paper or cloth or the like having a coating thereon of a thermosetting resin or a mixture of a thermosetting resin and additives such as sand, is also disclosed.

BACKGROUND OF THE INVENTION

(1) Field of the invention

This invention relates to an easily fabricated, low cost, strong and rigid composite tube, the tube comprises inner and outer layers composed of helically or crosswise wound glass fiber threads impregnated with a thermosetting resin (hereinafter designated as "resin") and an intermediate layer formed of laminated sheets of paper or cloth or the like having a coating thereon of the resin or a mixture of the resin and additives such as sand (hereinafter designated as "resin mortar"). The invention also relates to a method of producing the composite tube.

(2) Prior art

Several methods have been proposed for the production of a fiber-reinforced plastic tube (hereinafter designated as "FRP tube"). However, none of these methods are able to provide a FRP tube having the satisfactory strength and rigidity.

According to one method, glass fiber threads impregnated with a resin are wound helically or crosswise on a mandrel, and the glass fiber threads are distributed throughout the cross section of the tube. While the resultant tube has a sufficient strength, it also has a high production cost due to the amount of glass fibers required. The high cost is predominantly due to the fact that the glass fiber threads are unnecessarily formed in a zone intermediate to the inner and outer layers. This zone requires almost no strong glass fiber threads because no stress is applied generally thereto. Further, the reduction of the tube wall thickness to reduce the production cost causes a lowering in the rigidity of the tube.

According to a second method, sand or other inexpensive additive materials are mixed between the glass fiber layers in order to increase the wall thickness and rigidity. The cost for producing this type of tube is not reduced appreciably due to the unnecessary application of expensive glass fiber threads in the same intermediate zone as above.

According to a third method, a mixture of chopped glass fibers and resin is charged into a rotating metal mold to form first an outer layer. A resin or resin mortar layer then is formed on the interior of the outer layer to thereby form an intermediate layer. Finally, a layer comprising a mixture of chopped glass fibers and resins is formed on the interior of the intermediate layer to form an inner layer. However, the strength of the resultant composite tube is less than that of a tube obtained by the filament winding process.

According to a fourth method, glass fiber threads impregnated with a resin are wound on a mandrel to form an inner layer, the resultant inner layer is placed concentrically within a tubular metal flask to form thereby an annular space between the inner layer and the metal flask. Resin mortar then is poured into the annular space to form an intermediate layer on the exterior surface of the inner layer. After the intermediate layer is cured, the metal flask is removed and the exterior surface of the resultant intermediate layer is then machined (ground). Glass fiber threads impregnated with a resin are then wound on the intermediate layer to form thereby an outer layer followed by additional curing of the resinous material of the composite tube. Finally, the mandrel is drawn from the interior of the composite tube. According to this method, uniform pouring of the resin mortar into the narrow annular space is quite difficult and requires an optimum composition of resin and additives in order to obtain favorable fluidity. Otherwise, the resin and additives are mutually segregated before curing. In addition, the outer layer cannot be applied to the resin mortar intermediate layer before the resin mortar is at least semi-cured in order to prevent the intermediate layer from being deformed by the compressed pressure of the wound glass fiber threads and to prevent the intermediate layer from peeling off from the inner layer during the rotation of the mandrel. Further, machining or grinding of the surface of the intermediate layer is necessary to prevent the wound glass fiber threads from being cut off or broken due to projecting sharp sand grains of the resin mortar and to facilitate the adhesion of the outer layer with the intermediate layer.

Therefore, a primary object of this invention is to provide an economical and easy method for producing a strong and rigid composite tube by means of a "filament winding process."

Another object of this invention is to provide a continuous method of producing a filament-wound composite tube.

A further object of this invention is to provide a filament-wound composite tube which is reinforced along the axial direction.

A still further object of this invention is to provide a method for producing an axially-reinforced filament-wound composite tube.

SUMMARY OF THE INVENTION

The present invention provides an economical and easy method for producing a strong, rigid composite tube by means of a filament winding process. More specifically, an inner layer is first formed by winding glass fiber threads impregnated with a resin onto the surface of a mandrel. A continuous sheet of paper or cloth or the like, having thereon a coating comprised either of a resin or a resin mortar, is then wound on the exterior surface of the inner layer to form a laminated intermediate layer composed of the resin or resin mortar and the sheet of paper or cloth or the like. An outer layer is then formed over the intermediate layer by winding thereon glass fiber threads impregnated with resin. The entire assembly is then passed through a resin curing furnace in order to cure the resinous material in the composite tube. Finally, the mandrel is removed from the interior of the tube. The intermediate layer can comprise any number of laminations of the sheet of paper or cloth or the like having thereon the resin or resin mortar composition. In addition, the intermediate layer can contain, in the paper or cloth or the like, reinforcing members arranged axially to the composite tube in order to give the finished assembly greater strength in the axial direction.

DETAILED DESCRIPTION OF THE PREFERRED EMBODIMENTS

Figure 1:
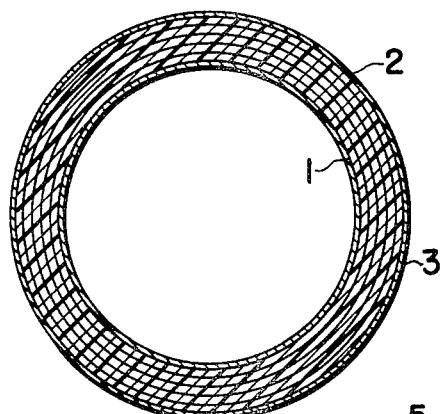
FIG. 1 is a lateral cross-sectional view of the composite tube according to this invention.
Figure 2:
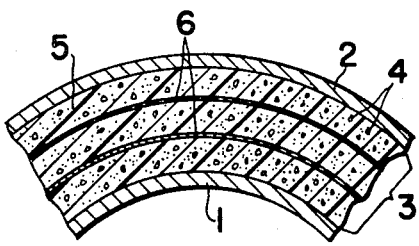
FIG. 2 is an enlarged view of a part of the tube cross-section.

Referring to FIGS. 1 and 2, the composite tube of this invention comprises inner and outer layers 1 and 2 composed of helically or crosswise wound glass fiber threads impregnated with the resin and a laminated intermediate layer 3 between the inner and outer layers 1 and 2 composed of the resin 5 or the resin mortar 5 and the sheet 6 of paper or cloth or the like.

Figure 3:
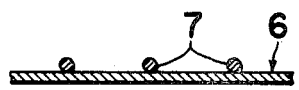
FIGS. 3 to 6 show the structure of the sheet with the reinforcing members.
Figure 4:
Figure 5:
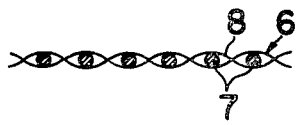
Figure 6:
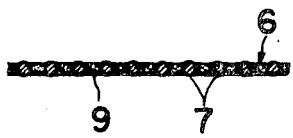

When greater axial strength is desired, the sheet 6 of paper or cloth or the like, as shown in FIGS. 3 to 6, can include axial reinforcing members 7 which, when incorporated with the resin or resin mortar layer 5, form the laminated intermediate layer 3. The reinforcing members are arranged to be aligned along the axial direction of the composite tube. Several embodiments of the structure of the reinforced sheet are shown in FIGS. 3 to 6. In FIG. 3, the reinforced sheet 6 is formed by applying the reinforcing members 7, such as metal wires or glass fiber threads arranged in mutually parallel lines, onto the sheet of paper or cloth or the like. In FIG. 4, the reinforced sheet 6 is formed by embedding the reinforcing members 7 into the sheet of paper or cloth or the like. In FIG. 5, the reinforced sheet 6 is formed by interweaving the reinforcing members 7 into the suitable threads 8. In FIG. 6, the reinforced sheet 6 is formed by binding the reinforcing members 7 with a suitable binder. The axial reinforcement methods are not to be limited to the aforesaid examples. Any other methods to increase the axial strength by inserting suitable reinforcing members in the axial direction of the composite tube appropriately can be adopted.

Since the composite tube of this invention is composed of strong inner and outer layers 1 and 2, and an intermediate layer 3 to increase the wall thickness, the composite tube has a high rigidity and strength to withstand internal and external pressures. The intermediate layer 3 can be formed using low cost sand or other inexpensive additives, since this portion of the tube will not undergo severe stress or bending. In addition, paper or cloth or the like and small amounts of the resin can be employed, thus reducing the consumption of expensive glass fiber threads and providing a low cost composite tube. Moreover, the strength and rigidity of the composite tube are further increased by applying various reinforcing members as described above to the composite tube along its axial direction. As particularly described above, the intermediate layer not only increases the strength of the tube but also increases its rigidity. Among the various resins which can be utilized in the practice of the present invention, the following are suitable: polyether resins, epoxy resins and the like.

The following examples will serve to illustrate the present invention further.

EXAMPLE 1

Figure 7:
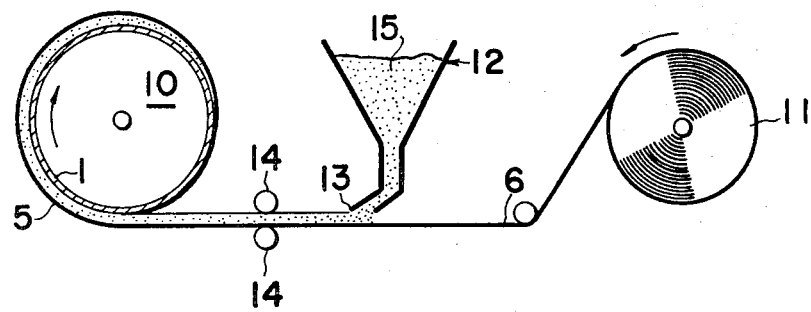
FIG. 7 is a schematic view showing each step of a method of producing the composite tube.

An inner layer 1 is formed by winding glass fiber threads impregnated with the resin on a surface of a mandrel 10, as shown in FIG. 7. A continuous sheet 6 of paper or cloth or the like wound on a sheet roll 11 is unwound, and resin 15 or resin mortar 15 in a hopper 12 is fed through a nozzle 13 onto the surface of the flowing sheet 6. The sheet 6 and resin 15 or resin mortar 15 are then passed through a leveler roller 14 to form a uniform resin 15 or resin mortar 15 layer on the sheet 6 and wound as many times as required on the surface of the inner layer 1 by rotating the mandrel 10 to thereby form a laminated intermediate layer 3 composed of resin 15 or resin mortar 15 and the sheet 6. Glass fiber threads impregnated with resin are then wound as in the case of forming the inner layer on the intermediate layer 3 to form an outer layer 2 and the entire assembly is cured, then the mandrel is removed from the resultant composite tube. According to the exemplified method, the laminated intermediate layer can be formed continuously and efficiently with the following advantages over prior art methods, especially the fourth one:

(a) Tubular metal flasks (i.e., the circular metal flask which surrounds the inner layer to form an annular cavity therebetween for the intermediate layer) are not necessary.

(b) The intermediate and outer layers 3 and 2 can be successively formed on the inner layer 1 by merely rotating the mandrel 10.

(c) The thickness of the intermediate layer 3 can be varied easily as desired.

(d) Cavity formation caused by an irregular-pouring rate of the intermediate layer material, as in the above-described fourth prior art method, does not occur.

(e) The outer layer 2 can be formed immediately after the formation of the intermediate layer 3, which does not need to be fully cured, because the uncured resin 15 or resin mortar 15 layer wound on the inner layer 1 and held thereto by the sheet 6 is not shifted or peeled from the inner layer 1 with the rotation of the mandrel 10 and, in addition, is not deformed by the compression of the wound glass fiber threads.

(f) The formation of the outer layer 2 on the uncured intermediate layer 3 can be conducted with ease and the uncured intermediate layer 3 can be integrally bound with the outer layer 2 comprising glass fiber threads without undergoing a surface treatment, such as machining or grinding, thus the desired composite tube is obtained.

(g) According to this method, using a tubular metal flask to form the intermediate layer, curing of the intermediate layer, and surface treating of the intermediate layer are not necessary, with the result that the stages in the production process are largely reduced, thereby increasing the speed with which the composite tube can be produced. Further, the apparatus for producing the composite tube is compact, and a strong and rigid composite tube can be obtained economically. Not only in this example, but also in other examples of this invention, either paper, cloth, unwoven cloth, metal foil or net material can be utilized for the sheet 6. However, it is preferable to use as the sheet material one which is easily impregnated with a resin, in order to bind intimately each lamination of the intermediate layer.

The additives 4 can be either sand, calcium carbonate, or clay, all of which are relatively inexpensive. Depending upon the nature of the sheet, a resin or resin mortar impregnated sheet can be used, instead of the resin mortar coated sheet to form the intermediate layer.

EXAMPLE 2

Figure 8:
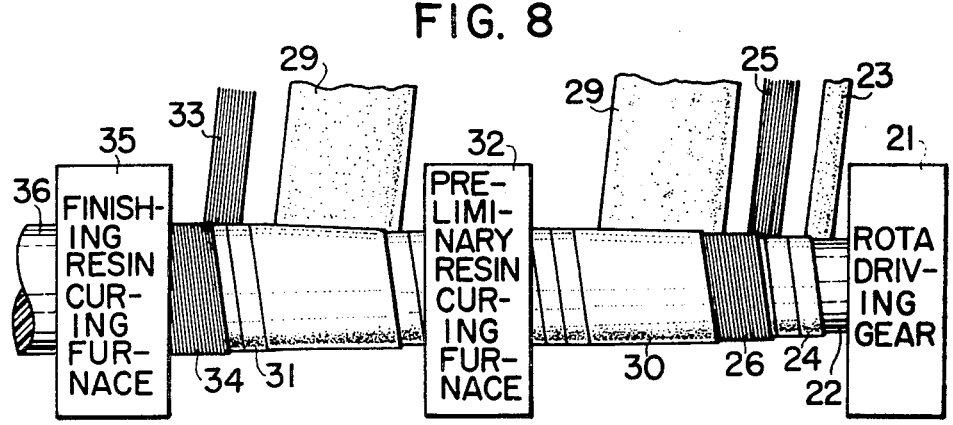
FIG. 8 is a schematic view showing each step of another embodiment of producing the composite tube of the present invention.
Figure 9:
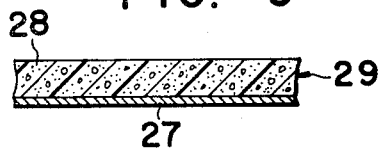
FIG. 9 is a cross-sectional view of an intermediate layer element.

Referring to FIGS. 8 and 9, a mandrel 22 is rotated by driving means 21 attached to one end of the mandrel 22.

A continuous parting tape 23, such as cellophane tape, is wound helically from the tape feeding means placed at a certain position, on the surface of the rotating mandrel 22 while being driven longitudinally to thereby form a parting tape layer 24. Glass fiber threads 25, impregnated with resin are simultaneously wound helically from the feeding means placed at a certain position on the parting tape layer 24 which is moving ahead longitudinally to form thereby an inner layer 26. As shown in FIG. 9, one or more intermediate layer elements 20 composed of a sheet material comprising cloth or paper or the like and uncured resin 28 or uncured resin mortar 28 coated thereon are then simultaneously wound helically on the inner layer 26 which is moving ahead longitudinally from the feeding means placed at a certain position to thereby form a single or laminated intermediate layer 30 or 31. Then, glass fiber threads 33 impregnated with resin wound helically from the feeding means placed at a certain position, on the intermediate layer 31 which is moving ahead longitudinally to form an outer layer 34. The uncured laminated tube is subsequently passed through a finishing resin curing furnace 35 to obtain the composite tube 36 continuously. The parting tape 23 can be replaced by a suitable parting agent coated on the surface of the mandrel 22. The cured composite tube 36 is drawn out of the mandrel 22 and then cut into any desired length. In lieu of a mandrel which rotates at a fixed position as shown in FIGS. 8 and 9, it is possible to employ a mandrel of a certain length which moves ahead longitudinally while rotating; in this case, the mandrel segments must be connected to obtain longer length composite tubes and the resultant tubes can be cut into shorter lengths at the junctions of the said mandrel segments. Although the means for driving various elements longitudinally are not illustrated in FIGS. 8 and 9, it is possible to drive said elements longitudinally by a driving roller which is not shown in the figures. The said elements can be driven longitudinally and helically by a plurality of driving rollers installed on the mandrel 22 in a slightly inclined direction against the axis thereof.

The resin curing furances 32 and 35 can be equipped with tube supporting rollers at the inner face thereof in such a way that the rollers will not obstruct the longitudinal movement of wound layers. Although in FIG. 8 a preliminary curing step by a preliminary resin curing furnace 32 is provided (complete curing is not required, but curing to some extent will suffice), where the preliminary resin curing furnace 32 is not provided, the outer layer 34 can be applied on the uncured intermediate layer 31 without any danger of peeling off and deformation of the resin 28 or resin mortar 28 layer caused by the external pressure at the time of forming an outer layer 34 because the resin 28 or resin mortar 28 layer is securely held by the sheet 27 onto the mandrel 22. A resin curing furnace 32 can be provided as a preliminary step of curing, in adequate numbers at a proper position before the finishing resin curing furnace 35. If and when such resin curing furnace 32 is provided, it is possible to speed up the production rate, preventing the production rate from dropping even where a tube of great thickness is to be produced, even one having accurate wall thickness. In addition, the preliminary resin curing furance 32 serves as supporting means for the middle segments of said mandrel.

Depending upon the nature of the sheet 27, a resin or resin mortar impregnated sheet can be used, instead of the resin or resin mortar coated sheet, to form the intermediate layer.

The composite tube obtained according to the method of Example 2 is of low cost and exhibits high strength and rigidity to withstand internal and external pressures as in the case of Example 1. Moreover, the length of the composite tube produced is not restricted, thus making it possible to obtain desired longer length composite tube. The mandrel need not be shifted or replaced in spite of the steps conducted, such as the inner layer forming step, the intermediate layer forming step, the intermediate layer curing step, the intermediate layer grinding step, the outer layer forming step or the final resin curing step and these steps can be successively conducted simply by feeding longitudinally onto the mandrel rotating at a fixed position, the elements comprising the respective layer, from the several feeding positions. Furthermore, the intermediate layer curing step and the intermediate layer grinding step can be omitted, thereby reducing the working time and compacting the tube-forming apparatus.

EXAMPLE 3

The composite tube produced according to Examples 1 and 2 has sufficient strength and rigidity for resisting high internal and external pressures, however, the analysis of the strength shows that the axis strength thereof is inferior to the radial strength. The radial strength of the composite tube can be fully exhibited by forming the inner and outer layers with wound glass fiber threads impregnated with resin, whereas the axial strength of the composite tube is not as satisfactory as the radial strength unless suitable reinforcing memebrs are applied thereto.

One method of reinforcing the axial strength of composite tube is, as shown in FIGS. 3, 4, 5 and 6, to wind a sheet 6 provided breadthwise with a plurality of reinforcing members 7, such as metal wires or glass fiber thread bundles, having a coating thereon of resin or resin mortar, on the inner layer 1 in the axial direction. In the production method of aforesaid Example 2 (FIG. 8), as well, the reinforcing is carried out by the same method as above using a sheet 27.

The angle of applying the reinforcing members to the sheet is determined by the angle between the mandrel and the sheet winding direction since it is desirable to arrange the reinforcing members in the axial direction of the composite tube.

According to this method, the forming of the intermediate layer and the application of the reinforcing members can be conducted in one step by winding the reinforcing member-carrying sheet on the inner layer. Thus, the composite tube can be obtained with ease, and, in addition, it exhibits satisfactory strength and rigidity not only in the radial direction but also in the axial direction due to the axially-arranged reinforcing members.

EXAMPLE 4

The axial strength of the composite tube can also be reinforced by the following method: when the resin impregnated glass fiber threads are wound helically on the surface of the mandrel and that of the intermediate layer, a bundle of glass fiber threads prearranged over the resin impregnated glass fiber threads which are about to be wound is cut continuously by a cutter installed or by other means into nearly the same width as that of the resin impregnated glass fiber threads to be wound on the mandrel and the intermediate layer and simultaneously dropped thereon in such a manner that said cut pieces are arranged in the axial direction of the composite tube. Furthermore, in this case, instead of cutting the bundle of glass fiber threads, pieces of glass fiber threads cut beforehand can be prepared and dropped when winding helically, on the resin impregnated glass fiber threads wound on the surface of the mandrel and the intermediate layer so that the cut pieces are aligned in a direction parallel to the tube axis.

In either of the above-mentioned cases, since each of the cut pieces is arranged in a direction parallel to the tube axis, reinforcement of the axial strength of the composite tube is readily achieved. Thus, the filament-wound composite tube of the present invention exhibits an improved strength and rigidity not only along the axial direction but also along the radial direction.

Since the inner and outer layers are impregnated with resin, both heat and chemical resistance are also imparted to the tube. By applying a sand layer on the outermost surface of the composite tube, the damage of the latter due to ultra-violet irradiation can be eliminated. The composite tube produced according to the method of the present invention can be applied to various uses; such as in pipelines for feeding or conveying water, sewage, various chemical liquids, sea water and as structural and building members.

What is claimed is:

1. A method of producing a filament-wound composite tube comprising:
   (a) winding glass fiber threads impregnated with a thermosetting resin onto the outer surface of a mandrel to form an inner layer of glass fiber thread;
   (b) feeding a coated sheet material comprising a resinous coating on a support onto the outer surface of said inner layer to form one intermediate layer thereon with the resinous coating being adjacent the outer surface of said inner layer between said outer surface and said support, said resinous coating being selected from the group consisting of a thermosetting resin and a resin mortar, said resin mortar being a mixture of a thermosetting resin and an additive selected from the group consisting of sand, calcium carbonate, clay and mixtures thereof, said support being a sheet material composed of a member selected from the group consisting of paper, woven cloth, nonwoven cloth, metal foil and net; and
   (c) winding glass fiber threads impregnated with a thermosetting resin onto the outer surface of said intermediate layer to form an outer layer of glass fiber threads to thereby form a composite tube consisting of said inner, intermediate and outer layers wherein said glass fiber threads are present only in said inner and outer layers.

2. A continuous method of producing a filament-wound composite tube comprising:
   (a) continuously feeding glass fiber threads impregnated with a thermosetting resin onto the outer surface of a rotating, longitudinally-advancing mandrel from a first feeding means placed at a first position to thereby helically wind said glass fiber threads thereon to form an inner layer of said glass fiber threads;
   (b) continuously feeding a coated sheet material comprising a resinous coating on a support onto the outer surface of said inner layer to thereby helically wind said coated sheet material onto said outer surface of said inner layer to thereby form one intermediate layer thereon with the resinous coating being adjacent the outer surface of said inner layer between said outer surface and said support, said resinous coating being selected from the group consisting of an uncured thermosetting resin and a mixture of an uncured thermosetting resin and an additive selected from the group consisting of sand, calcium carbonate, clay and mixtures thereof, said support being a sheet material composed of a member selected from the group consisting of paper, woven cloth, nonwoven cloth, metal foil and net;
   (c) continuously feeding glass fiber threads impregnated with a thermosetting resin onto the outer surface of said intermediate layer which is moving ahead longitudinally to thereby helically wind said glass fiber threads onto the outer surface of said intermediate layer to thereby form an outer layer of glass fiber threads, said glass fiber threads being impregnated with a thermosetting resin; and
   (d) continuously passing the resulting assembly through a final resin curing furnace to cure any uncured thermosetting resin and thereby form a composite tube consisting of said inner, intermediate and outer layers wherein said glass fiber threads are present only in said inner and outer layers.

3. A method as claimed in claim 2, wherein said resultant assembly is continuously passed through one or more preliminary resin curing furnaces prior to said step of passing said resultant assembly through said final resin curing furnace.

4. The method of claim 1 wherein a plurality of reinforcing members are applied to said support of said coated sheet material prior to coating said support with said resinous coating and prior to feeding said coated sheet material onto said outer surface of said inner layer, said reinforcing members being applied to said support in a direction such that said reinforcing members are aligned parallel to the axis of said composite tube when said coated sheet material is fed onto said inner layer.

5. The method of claim 2 wherein a plurality of reinforcing members are applied to said support of said coated sheet material prior to coating said support with said resinous coating and prior to feeding said coated material onto the outer surface of said inner layer, said reinforcing members being applied to said support in a direction such that said reinforcing members are aligned parallel to the axis of said composite tube when said coated sheet material is fed onto said inner layer.

6. The method of claim 3 wherein a plurality of reinforcing members are applied to said support of said coated sheet material prior to coating said support with said resinous coating and prior to feeding said coated sheet material onto the outer surface of the inner layer, said reinforcing members being applied to said support in a direction such that said reinforcing members are aligned parallel to the axis of said composite tube when said coated sheet material is wound onto said inner layer.

7. A method as claimed in claim 1, wherein said thermosetting resin is a polyester resin or an epoxy resin.

8. A method as claimed in claim 4, wherein said reinforcing members comprise metal wires.

9. A method as claimed in claim 1 further comprising, prior to winding said glass fiber threads on said surface of said mandrel, winding on the surface of said mandrel a parting tape, thereby allowing the composite tube to be more easily removed from the mandrel after formation.

10. A method as claimed in claim 9 wherein said parting tape comprises cellophane tape.

11. A method as claimed in claim 1 wherein, prior to winding said glass fiber threads on the surface of said mandrel, a parting agent is coated onto the surface of said mandrel thereby allowing the easy removal of the composite tube after the formation thereof on said mandrel.

References Cited

UNITED STATES PATENTS

| | | | |
|---|---|---|---|
| 2,748,830 | 6/1956 | Nash et al. | 156—173 X |
| 3,470,917 | 10/1969 | Grosh | 156—173 X |
| 3,379,591 | 4/1968 | Bradley | 156—173 |
| 3,532,579 | 10/1970 | Havens et al. | 156—272 X |
| 3,431,158 | 3/1969 | Poulsen | 156—173 |
| 3,414,448 | 12/1968 | Harpfer | 156—184 X |
| 3,389,009 | 6/1968 | McNulty et al. | 156—187 X |
| 3,520,749 | 7/1970 | Rubenstein | 156—173 |

CARL D. QUARFORTH, Primary Examiner

E. E. LEHMANN, Assistant Examiner

U.S. Cl. X.R.

138—175; 156—171, 173, 192, 289